March 31, 1964     R. H. APPELDORN     3,126,786
OVERHEAD PROJECTION SYSTEM

Filed July 20, 1962     2 Sheets-Sheet 1

INVENTOR
ROGER H. APPELDORN

BY *Carpenter Abbott Coulter & Kinney*
ATTORNEYS

March 31, 1964　　　R. H. APPELDORN　　　3,126,786
OVERHEAD PROJECTION SYSTEM
Filed July 20, 1962　　　　　　　　　　2 Sheets-Sheet 2

INVENTOR
ROGER H. APPELDORN
BY
Carpenter Abbott Coulter & Kinney
ATTORNEYS

United States Patent Office

3,126,786
Patented Mar. 31, 1964

3,126,786
OVERHEAD PROJECTION SYSTEM
Roger H. Appeldorn, White Bear Lake, Minn., assignor to Minnesota Mining and Manufacturing Company, St. Paul, Minn., a corporation of Delaware
Filed July 20, 1962, Ser. No. 211,230
9 Claims. (Cl. 88—24)

This invention relates to a projection system including a novel lens assembly and more particularly to a projection system and lens assembly for use in overhead projectors or the like wherein it is desirous to bend the path of the projected light.

Overhead projectors are conventionally placed at the front of the classroom, between the class and the projection screen, while the room is illuminated to a level permitting usual classroom activities. The instructor stands at the projector, facing the class, and comments on the material shown while placing the transparencies on the projection stage.

Prior art overhead projectors, although useful, have been found deficient in a number of respects. The large projection heads hindered free access to the transparency on the stage and interfered with the view of the screen by some of the class members. Those projectors in which the mirror was mounted in an adjustable manner on one side of the lens assembly to raise or lower the projected image required an especially large projection head. Those projectors in which the entire projector was tilted to position the projected image required additional parts which increase the cost, and re-focusing was necessary with each tilting adjustment.

The present invention provides an overhead projector having a readily accessible stage on which transparencies may be placed, marked, masked in part, rearranged or otherwise manipulated with ease. Screen visibility, particularly for class members in the line of the screen and projector, is greatly improved. The projected image may be raised or lowered on the screen by a simple positioning of the projection head and without loss of focus.

It has now been found that these and other advantages are attained in an overhead projector including, in conjunction with a light source and the usual means for directing light from the source through a horizontally held transparency and upwardly in a cone of light, a projection head having first and second converging meniscus lenses and a flat mirror in triangular arrangement and positioned such that the axial ray of the cone of light enters the first lens from the convex side and generally radial to the mean curvature, passes directly to the mirror, and is reflected directly to the concave surface of the second lens to pass substantially through its center. In addition the head is vertically adjustable or otherwise positioned such that the location of the real image of the light source produced by said light directing means is substantially between the two lenses.

It is therefore an object of the present invention to provide a novel projection system including a unique position adjustable projection head assembly which is compact and economical, and which incorporates a small mirror as the optical path bending means.

A further object of the present invention is to provide a small projection head lens assembly adapted to be pivoted throughout a predetermined range to raise or lower a projected image on a screen or wall and still maintain sufficient resolution on said screen in all selected positions.

These and other objects will become more apparent upon reading the more detailed specification which follows and by reference to the accompanying drawings of which:

Figure 1:
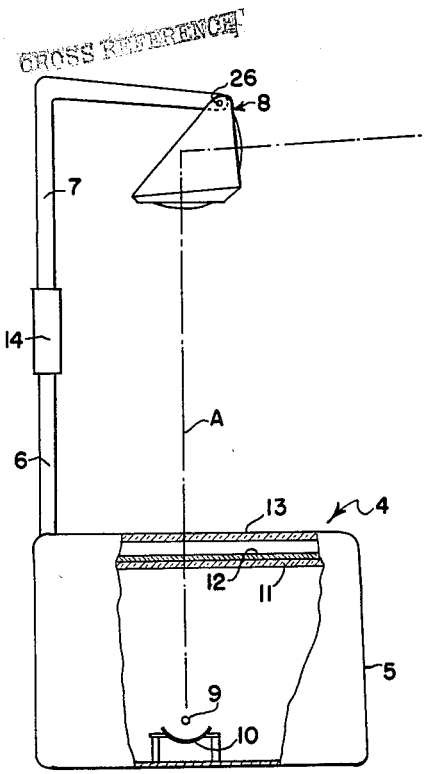
FIGURE 1 is a diagrammatic view of a projector assembly constructed in accordance with the present invention.

The projection system and bent lens assembly of the present invention find particular advantage when incorporated in an overhead projector, for example, of the type illustrated in FIGURE 1. The lens assembly provides many advantages heretofore not present in overhead projectors. The overhead projector, generally designated 4 in FIGURE 1, comprises a box-like case 5, a post 6, an angled mounting bracket 7 and a projection head assembly generally designated 8. The post 6 is rigidly supported adjacent one end of the case 5 and is centrally located with respect thereto. A suitable light source 9, such as an incandescent lamp having a quartz or high temperature glass envelope filled with iodine vapor and having a small filament, approximately 3/8 inch in length and 5/32 inch in coil diameter, is positioned adjacent the bottom of the case 5. A dichroic reflector 10 is mounted below the lamp 9 to utilize more of the available light. Light rays from the source 9 pass through a pair of back-to-back Fresnel condensing lenses 11 and 12 and a transparent stage 13, which may be a flat piece of glass mounted in the upper surface of the case 5 parallel to said lenses.

In the following description the expression "transparency" denotes the object to be projected, usually 10 inches by 10 inches in size but not necessarily limited to this size, and the expression "screen" denotes the receiving surface upon which the image is projected. This receiving surface may be a wall or screen. The lens elements of the lens assembly are numbered from front to rear in the direction of light travel. The term "axial ray" denotes the center of the projected cone of light, and is shown in the drawings by the broken line A. The term "incident axial ray" is used to denote the axis of the cone of light between the transparency and the projection head assembly 8, and the term "reflected axial ray" is used to denote the axis of the cone of light between said head assembly and the screen. The term "object distance" is used to denote the distance between the surface of the stage 13 and the front lens element 1 plus one-half the length of the optic axis between the front lens 1 and rear lens element 3, and the term "image (or focal) distance" is used to denote the distance between the screen or image plane and the surface of rear lens element plus one-half the length of the optic axis between said front and rear lens elements.

Figure 2:
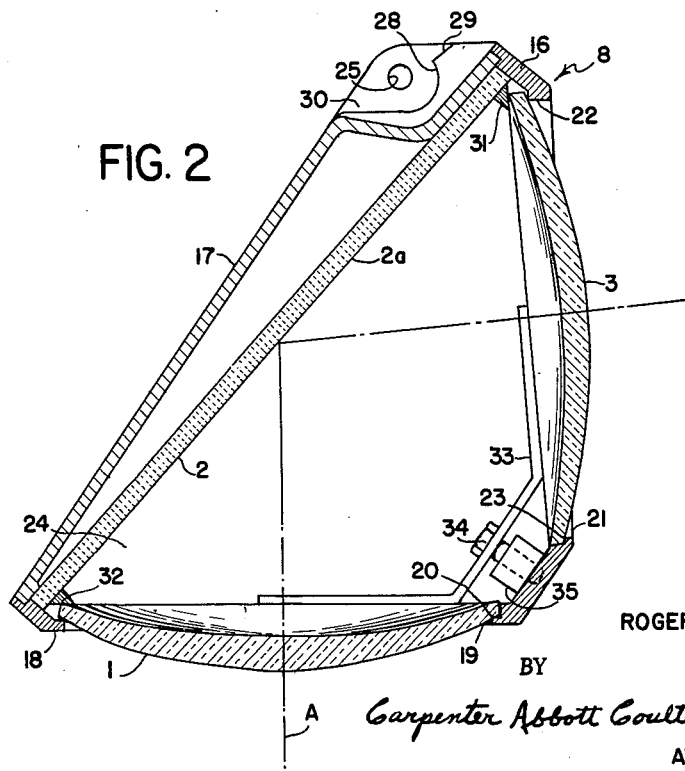
FIGURE 2 is a detail vertical sectional view of the projection head constructed in accordance with the present invention.

The projection head assembly 8, shown in FIGURE 2, includes a lens or optic system comprising a first converging meniscus or concavo-convex meniscus lens element 1, a reflector in the form of a flat mirror 2 and a second converging meniscus or concavo-convex meniscus lens element 3. A frame structure 16 supports the lens elements, and said structure is substantially triangularly shaped in vertical section. Frame structure 16 is preferably cast in one piece, and has a cover portion 17 which is separable therefrom. The structure 16 includes a substantially square portion 18 at the front side thereof, and said front portion contains a circular opening 19 formed centrally therethrough. Front portion 18 is recessed around the entire opening 19, in order to form a shoulder 20 for retaining the lens element 1. A rear portion 21 is formed with a similar opening 22 and shoulder 23 to retain the lens element 3. The mirror 2 is rectangular in shape and is fitted within the structure 16, so as to be protected and retained therein by the cover 17 which is secured by suitable means to said structure. Side portions 24, only one of which is shown in the drawing, are attached to each side of frame structure 16, to complete the enclosure. Side portions 24 are formed to contain pieces which project upwardly from the main enclosure, and said projecting pieces are provided with aligned openings 25, only one of which is shown. Openings 25 are adapted to receive means, such as a rod 26 or pins, in order to pivotally mount the head assembly 8 on the bracket 7 for arcuate movement about the axis of said openings. The extending pieces of side portions 24 are also formed with recessed surface portions 28 on the inner surfaces thereof, and said recessed portions are shaped to form shoulders 29 and abutment edges 30. The shoulders 29 and abutment edges 30 are engageable with the bracket 7 to provide stops for limiting the pivotal movement of the projection head 8 by a predetermined amount.

The meniscus lenses 1 and 3 are held in place against the shoulders 20 and 23 by suitable retaining members. The retaining members comprise triangularly shaped bars 31 and 32 which extend between the side portions 24 and a pair of molded brackets 33, only one of which is shown in the drawings. The brackets 33 are formed of plastic or other suitable material, and are positioned adjacent each side portion 24. Brackets 33 are held in place by bolts 34 which extend through the center portions of a pair of threaded bosses 35, which bosses are formed in the frame structure 16. The brackets 33 extend along the edges of the front and rear portions 18 and 21 respectively, and are engageable with the edges of the lenses 1 and 3 to press the same against the shoulders 20 and 23.

The Fresnel lenses 11 and 12 together have an equivalent focal length of 5 inches. The lower lens 11 is preferably positioned about 7 inches above the light source 9 and the stage 13 is spaced from the lens 12, a distance of ⅝ inch. The stage 13 has an axial thickness of 3/32 inch.

The transparency is placed upon the stage 13 and as a result of the condensing lenses 11 and 12 the light and image of the object are directed upwardly in a cone or bundle of light rays having an incident axial ray A, which is intercepted by the optical system of the projection head 8. The image of the lamp filament in the projection system is positioned 17⅛ inches above the stage 13. The head assembly 8 is adjustably positioned with respect to the stage 13 by an adjustable collar 14, connecting the post 6 and bracket 7, to permit focusing of the projected image on a remote screen. The collar 14 allows vertical adjustment within a given range such that the distance between the stage 13 and surface of lens 1 may vary between 13 inches and 15 9/16 inches. In all positions, however, the image of the filament of the light source 9 will be positioned within the head assembly 8 between the lens elements 1 and 3. The head 8 is pivotally mounted on the bracket 7, as will be described in greater detail hereinafter, and this allows the operator to raise and lower the projected image on the screen or wall by simply swinging said head. This eliminates the necessity of tilting the entire projector 4, which might place the stage at an angle such that the operator is inconvenienced, and the projection head has a high degree of compactness which does not obstruct the view of the screen by the audience. Additionally, the image may be raised without necessitating readjustment of the head to obtain proper focus of the image in the raised position.

With regard to the construction and positioning of the lenses 1 and 3, reference is made to the following tables, wherein the values there shown for the radii of curvature R, the axial thickness $t$, and the air spacing S between the lenses 1 and 3 are expressed in a customary manner, with the usual subscripts indicating a particular surface numbered from front to rear. The spacing S is equal to the sum of $S_1$, which is the distance along the optic axis between the lens element 1 and the mirror 2, and $S_2$ the distance along the optic axis between the mirror 2 and the lens element 3. The plus values of the radii R indicate surfaces convex to the incident radiation and the minus values of the radii R indicate surfaces concave to the incident radiation, in accordance with conventional notation. The respective refractive indices $N_D$ are expressed in reference to the spectral D line, and the dispersive indices or Abbe numbers are indicated by V.

The mirror 2 used in the lens system as the light path bending means is a flat mirror with good reflective properties, preferably 90% or better at an angle of incidence between 40 and 50 degrees. As an illustrative example a mirror which is 5⅜ inches long and 3 45/64 inches wide is of sufficient size for use in a projection head constructed in accordance with the present invention.

A specific example of the lens elements and their respective positions is one which has an equivalent focal length of 352.81 mm. and a relative aperture $f$:4.1, and which is constructed in accordance with the numerical data in Table 1 below, the various symbols therein having the well known meanings explained above.

*Table 1*

| Lens | $N_D$ | V | Radii, mm. | Thicknesses and Air Space, mm. |
| --- | --- | --- | --- | --- |
| 1 | 1.523± .001 | 58.6± .5 | $R_1=+106.0$ $R_2=+153.5$ | $T_1=6.0\pm .3$ $S=(S_1+S_2)=114.29$ |
| 3 | 1.523± .001 | 58.6± .5 | $R_3=-153.5$ $R_4=-106.0$ | $T_3=6.0\pm .3$ |

Each lens surface may be assigned (as a matter of convenience) a Y value which is a ratio of the effective focal length of the lens assembly to the radius of curvature for the individual lens surface. This provides Y values ($Y_1$ is the Y value of lens surface $R_1$, etc.) as follows:

$$Y_1=3.3$$
$$Y_2=2.3$$
$$Y_3=2.3$$
$$Y_4=3.3$$

A second example of a lens system is one which has an equivalent focal length of 362.862 mm. and a relative aperture $f$:4.1, and which is constructed in accordance with the numerical data in Table 2 below.

*Table 2*

| Lens | $N_D$ | V | Radii, mm. | Thicknesses and Air Space, mm. |
| --- | --- | --- | --- | --- |
| 1' | 1.523± .001 | 58.6± .5 | $R_{1'}=+98.8$ $R_{2'}=+137.0$ | $T_{1'}=6.0\pm.3$ $S=(S_1+S_2)=120$ |
| 3' | 1.523± .001 | 58.6± .5 | $R_{3'}=-137.0$ $R_{4'}=-98.8$ | $T_{3'}=6.0\pm.3$ |

Y values for lens surfaces of this second example are:

$$Y_1' = 3.7$$
$$Y_2' = 2.7$$
$$Y_3' = 2.7$$
$$Y_4' = 3.7$$

Figure 3:
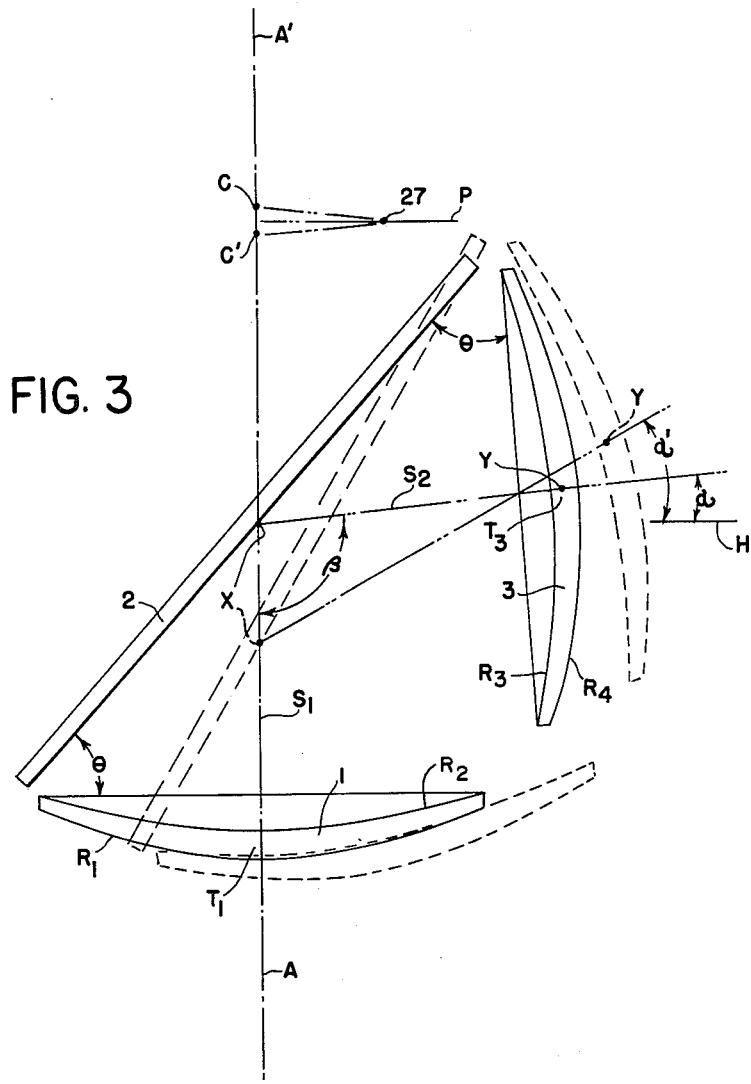
FIGURE 3 is a diagrammatic view of a lens assembly constructed in accordance with the present invention.

Referring now to FIGURE 3, the three optical elements are illustrated diagrammatically with the assembly shown in two positions with respect to the incident axial ray of the incident radiation or bundle of rays. It is to be noted that the mirror 2 is affixed at an angle $\theta$ with respect to the convex meniscus lens elements 1 and 3. In the illustrated embodiment $\theta$ is equal to 47½°, thereby providing a built-in projection angle $\alpha$, formed between a line H indicating a horizontal plane and the reflected axial ray, of 5° as shown in solid lines. However, the angle $\theta$ may vary between 40° and 50° providing a built-in projection angle for the reflected axial ray above and below the horizontal from 0° to 10°. In the position shown in solid lines in FIGURE 3 the incident and reflected axial ray coincide with the optic axis of the system, and, since it is known that the angle of incidence equals the angle of reflection, the summation of the two angles is illustrated by the angle $\beta$ and in the illustrated embodiment angle $\beta$ equals 95°. This also shows that for every degree the mirror is moved with respect to the horizontal the path of the reflected axial ray is increased by two degrees with respect to the horizontal.

The projection head assembly is adapted to be tilted about an axis normal to the plane of the incident and reflected axial ray. The angle of incidence with respect to the light path bending means 2 will increase or decrease depending upon the direction of the tilting movement and thus the projection angle may be increased or decreased. To raise the projected image, the head may be tilted upward as much as 12° from the position shown in solid lines in FIGURE 3 to that shown in dotted lines at which the projection angle $\alpha'$ equals 29°, an increase of 24°. Alternatively, the lens system can be tilted downward to lower the projected image and in the illustrated embodiment the preferred range for tilting the system is between a projection angle of −5° and +29°, the minus sign representing an angle below the horizontal plane H, the plus sign indicating an angle above the horizontal plane H.

The location of the axis about which the projection head assembly 8 may be pivoted will depend upon the use to which said assembly is applied. However, in all applications the assembly 8 must be pivoted about an axis such that when said assembly is pivoted the reflected axial ray will pass substantially through a center point Y of the lens 3, and the incident axial ray will remain substantially radial to the mean curvature of the lens element 1 throughout the range of pivotal movement. To accomplish this end in all positions of tilting movement of the head and lens assembly relative to the incident axial ray, a point C which is a virtual image or mirror image of the center point Y must remain in a position on line or substantially on line with the incident axial ray. In FIGURE 3 of the drawing, a line A' representing an extent of the incident axial ray A has been shown and the point C is located thereon. The point C is positioned on the line A' above a point of incidence X on the mirror 2 a distance equal to the spacing $S_2$ between the point X and lens element 3 plus ½ the thickness ($t_3$) of the lens 3.

The lenses in the head assembly 8 allow a slight amount of tolerance such that the point Y indicating the center of the lens 3 could be located on the optic axis of the lens at any point throughout the axial thickness thereof. This also permits the virtual image C of the point Y to deviate from the position shown in the drawing an amount equal to the thickness of lens element 3 throughout the pivoting movement without destroying the resolution of the projected image on a screen.

By tilting the assembly 8 about the point C or closely adjacent thereto, the incident axial ray will be intercepted by the lens 1 and will be substantially radial with respect to the curved surfaces of said lens, and said ray will be reflected from the mirror 2 to pass through the center point Y of the rear lens element 3 in all positions of the assembly throughout the tilting movement. When this point C is selected as the pivot axis it is preferable to have the screen inclined with respect to the horizontal such that the focal distance between the lens element 3 and the screen remains substantially constant in all positions and the screen remains substantially normal to the reflected axial ray of the projection head throughout the predetermined range of pivotal movement.

An inclined screen is not ordinarily available and therefore a different pivot axis is selected to provide the proper pivoting of the projection head 8, such that the reflected axial ray will pass substantially through the center point Y of lens element 3 and maintain throughout the pivoting movement the image quality desired on a vertical screen. When it is desired to pivot the head upward and downward to the same extent, a point along a line perpendicular to the line A' and passing through the point C is selected as the location of the tilting axis.

A point 27, illustrated in FIGURE 3, defining the pivot axis through the openings 25, will provide the proper location of the incident and reflected axial ray and will allow pivotal movement upward to a greater extent than downward and still maintain the focus of the projected image. As the head assembly 8 is pivoted about an axis through point 27, the lens element 1 is moved downward toward the stage. This decreases the object distance when the focal distance is increased and results in maintaining the desired image quality on the screen.

The position of the point 27 about which the illustrated lens system is pivoted as a unit is determined by first calculating the displacement or change in the object distance necessary to maintain the image in focus at the increased image distances as the image is raised on a vertical screen positioned a fixed distance from the projector 4. For a lens assembly having a fixed focal length, and positioned above the stage a distance to focus the image on a vertical screen, this change in the object distance is easily determined as said assembly is pivoted throughout a predetermined angular range with respect to said screen. This calculation is made by the use of the following equation:

$$\Delta O = F\left(\frac{I_1}{I_1 - F} - \frac{I_2}{I_2 - F}\right)$$

wherein $\Delta O$ is the change in the object distance, F equals the focal length of the lens assembly, $I_1$ is the image distance to the screen along the reflected axial ray at the first position or at 5° in the illustrated embodiment and $I_2$ is the image distance to the screen along the reflected axial ray when the ray is at the upper limit of the tilting movement or at 29° with respect to the horizontal as in the illustrated embodiment. The distances $I_1$ and $I_2$ may be measured or trigonometrically determined and substituted into the above formula.

After the change in the object distance is determined a second point C' is plotted on the line A' below the point C a distance equal to the change in the object distance $\Delta O$ required. A line P may then be drawn perpendicular to the extended incident axial ray A' through a point halfway between the point C and the point C'. The pivot axis 27 is located along said perpendicular line P a distance from the ray A', such that radial lines from the points C and C' to the axis 27 will define an angle therebetween equal to the desired angle or angular range, in the illustrated example 12°, through which the lens system is vertically pivoted. The pivoting of the projection head about an axis thus determined will provide the vertical change in the object distance required to maintain an image in focus as it is moved up a vertical screen.

Other points as aforementioned for the tilting axis may be selected but they must be selected such that when the assembly is pivoted thereabout, the imaginary point C remains substantially in line with the incident axial ray, providing a pivoting movement of the reflected axial ray or optic axis about the center point Y of the lens 3.

A physical aperture stop is not provided in the illustrated lens system and the image of the filament of the light source 9 is used as the aperture stop, allowing the assembly to be tilted and still project the entire image. As aforementioned the image of the filament is positioned within the head assembly. The size of the lamp filament or the filament of the light source is reduced as much as possible. This allows the assembly to be pivoted throughout a wider range without stopping any of the incident radiation. The reduced filament size also reduces the area of the lens elements used at a single operating position of the assembly and in this manner distortion in the projected image by numerous aberrations is reduced.

Although only a preferred embodiment has been shown and described, it is to be understood that the foregoing disclosure is given by way of example only, rather than by way of limitation, and that without departing from the invention, the details may be varied within the scope of the appended claims.

What is claimed is:

1. An overhead projector suitable for use in the front of a classroom to project on a vertical screen a light image of a horizontally held transparency and, when in position for said projecting, comprising:
   a box-like case;
   a light source mounted in said case;
   a transparent member mounted on said case to provide a substantially horizontal projection stage;
   a condensing lens positioned beneath and adjacent said transparent member and above said light source for collecting light from said source and directing the same upwardly through said transparent member in a cone of light having an incident axial ray;
   a projection head consisting essentially of
      a pair of converging meniscus lenses which are small relative to said condensing lens, and
      a reflecting means affording a single flat reflecting surface positioned between and in triangular arrangement with said meniscus lenses, the concave surfaces of which face said reflecting surface; and
   means positioning said projection head above said projection stage such that said incident axial ray passes through one of said meniscus lenses generally radial to the mean curvature thereof and directly to said reflecting surface to be reflected thereby directly toward and substantially through the center of the other of said meniscus lenses, and at a height such that the real image of said light source produced by said condensing lens is substantially between said pair of meniscus lenses.

2. An overhead projector suitable for use in front of a classroom to project on a vertical screen a light image of a horizontally held transparency and, when in position for said projecting, comprising:
   a box-like case;
   an incandescent lamp mounted in said case;
   a flat, rigid, transparent member mounted on said case to provide a substantially horizontal projection stage;
   a condensing lens positioned beneath and adjacent said transparent member and directly above said lamp for collecting light therefrom and directing the same upwardly through said transparent member in a cone of light having an incident axial ray;
   a projection head consisting essentially of
      a pair of converging meniscus lenses which are of substantially equal size and are less than half the size of said condensing lens, and
      a flat mirror positioned between and in triangular arrangement with said meniscus lenses, the concave surfaces of which face said mirror; and
   means for supporting and positioning said projection head above said projection stage and including
      means for pivoting said mirror to afford vertical adjustment of a said light image and for maintaining said meniscus lenses such that said incident axial ray passes through one of said meniscus lenses generally radial to the mean curvature thereof and directly to said mirror to be reflected thereby directly toward and substantially through the center of the other of said meniscus lenses, and
      means affording adjustable spatial relationship between said head and said projection stage to focus a said light image on a remote screen.

3. An overhead projector suitable for use in front of a classroom to project on a vertical screen a light image of a horizontally held transparency and, when in position for said projecting, comprising:
   a box-like case;
   a light source mounted in the lower portion of said case and including an iodine-filled incandescent lamp and a reflector;
   a substantially horizontal, flat, rigid, transparent projection stage closing the top of said case;
   a Fresnel-type condensing lens positioned beneath and in closely adjacent aligned relation with said stage and positioned directly above said light source for collecting light from said source and directing the same upwardly through said stage in a cone of light having an incident axial ray;
   a unitary projection head consisting essentially of
      a pair of converging meniscus lenses which are small relative to said condensing lens,
      a flat mirror positioned between said meniscus lenses, and
      frame means for supporting said meniscus lenses and mirror in a triangular arrangement with the concave surfaces of both lenses adjacent the mirror such that said incident axial ray passes through one of said meniscus lenses generally radial to the mean curvature thereof and directly to said mirror to be reflected thereby directly toward and substantially through the center of the other of said meniscus lenses; and
   means for supporting and positioning said projection head above said projection stage and including
      means pivotally supporting said head to afford vertical adjustment of a said light image projected therethrough and for maintaining said one of said meniscus lenses such that said incident axial ray remains generally radial to the mean curvature of said lens and the reflected axial ray passes substantially through the center of the other of said meniscus lenses throughout a predetermined range of pivotal movement, and
      means affording vertical adjustment of the spatial relationship between said head and said projection stage to focus a said light image on a remote screen.

4. In an overhead projector suitable for projecting on a vertical screen a light image of a horizontally held transparency, which projector includes a light source, condensing lens for gathering light from said source and directing the same through a horizontally held transparency and upwardly in a cone of light including an incident axial ray, as a new means for directing the light toward a remote screen:
   a unitary projection head consisting essentially of
      a pair of converging meniscus lenses which are small relative to said condensing lens,
      a reflecting means affording a single flat reflecting surface positioned between said meniscus lenses, and frame means for supporting said meniscus lenses and reflecting surface in a triangular arrangement with the concave surfaces of both lenses adjacent the mirror such that said incident axial ray passes through one of said meniscus lenses generally radial to the mean curvature thereof directly to said reflecting surface to be reflected thereby directly toward and substantially through the center of the other of said meniscus lenses; and means for supporting and positioning said projection head above said transparency at a height such that the real image of said light source produced by said condensing lens is substantially between said pair of meniscus lenses and including means for pivoting said reflecting surface about an axis perpendicular to the plane of said incident and reflected axial ray to afford vertical adjustment of a said light image, and for maintaining said one of said meniscus lens in a position to intercept the cone of light with the incident axial ray generally radial to the mean curvature thereof.

5. An overhead projector suitable for use in front of a classroom to project on a vertical screen a light image of a horizontally held transparency, which projector includes a light source, means for directing light from the source through a horizontally held transparency and upwardly in a cone of light including an axial ray, and a projection head comprising, first and second converging meniscus lenses and flat reflecting means for diverting the light toward a vertical screen characterized in that said first meniscus lens is positioned adjacent the reflecting means to directly intercept the upwardly directed cone of light such that the axial ray impinges on the convex surface of the first lens, passes through the lens generally radial to the main curvature of its surfaces and is transmitted directly to said reflecting means, said second meniscus lens is positioned adjacent the reflecting means such that the axial ray is reflected therefrom directly to impinge on the concave surface of the second lens and to pass substantially through its center, and the projection head is mounted at a height such that the real image of the light source produced by said light directing means is substantially between the pair of converging lenses.

6. An over head projector suitable for use in front of a classroom to project on a vertical screen a light image of a horizontally held transparency and, when in position for said projecting, comprising:

a box-like case;

a light source mounted in said case;

a transparent member mounted on said case to provide a substantially horizontal projection stage;

a condensing lens positioned beneath and adjacent said transparent member and above said light source for collecting light from said source and directing the same upwardly through said transparent member in a cone of light having an incident axial ray;

a projection head consisting essentially of a pair of converging meniscus lenses which are small relative to said condensing lens, the concave surface of each meniscus lens having a Y value, as herein defined, in the range of 3.3 to 3.7 and the convex surface of each meniscus lens having a Y value in the range of 2.3 to 2.7, and a reflecting means affording a single flat reflecting surface positioned between and in triangular arrangement with said meniscus lenses, the concave surfaces of which face said reflecting surface; and means positioning said projection head above said projection stage such that said incident axial ray passes through one of said meniscus lenses generally radial to the mean curvature thereof and directly to said reflecting surface to be reflected thereby directly toward and substantially through the center of the other of said meniscus lenses, and at a height such that the real image of said light source produced by said condensing lens is substantially between said pair of meniscus lenses.

7. An overhead projector as defined in claim 1, wherein the converging meniscus lenses and their spatial relationship to each other are substantially in accordance with the data in the following table:

| Lens | N | V | Radii | Thicknesses |
|---|---|---|---|---|
| 1 | 1.523±.001 | 58.6±.5 | $R_1 = +106.0$<br>$R_2 = +153.5$ | $T_1 = 6.0 ± .3$<br>$S = (S_1 + S_2) = 114.29$ |
| 3 | 1.523±.001 | 58.6±.5 | $R_3 = -153.5$<br>$R_4 = -106.0$ | $T_3 = 6.0 ± .3$ | wherein the lenses are numbered as in the drawing, the corresponding refractive indices N for the D line of the spectrum are given in the second column, the corresponding dispersive indices V are given in the third column, the radii of curvature R of the lens surfaces are given in the fourth column, the respective surfaces being numbered in order from the stage toward the screen and being respectively identified by the subscript numeral used with each R, plus and minus values of R indicating curved surfaces which are respectively convex and concave toward the stage, the axial thickness T of the respective lenses and the axial thickness S of the air space between said lenses being given in the fifth column, the respective lens to which the T value applies being identified by corresponding numerical subscripts, the values of R, T and S all being expressed in millimeters.

8. An overhead projector as defined in claim 1, wherein the converging meniscus lenses and their spatial relationship to each other are substantially in accordance with the data in the following table:

| Lens | N | V | Radii | Thicknesses |
|---|---|---|---|---|
| 1 | 1.523±.001 | 58.6±.5 | $R_1 = +98.8$<br>$R_2 = +137.0$ | $T_1 = 6.0 ± .3$<br>$S = (S_1 + S_2) = 120$ |
| 3 | 1.523±.001 | 58.6±.5 | $R_3 = -137.0$<br>$R_4 = -98.8$ | $T_3 = 6.0 ± .3$ | wherein the lenses are numbered as in the drawing, the corresponding refractive indices N for the D line of the spectrum are given in the second column, the corresponding dispersive indices V are given in the third column, the radii of curvature R of the lens surfaces are given in the fourth column, the respective surfaces being numbered in order from the stage toward the screen and being respectively identified by the subscript numeral used with each R, plus and minus values of R indicating curved surfaces which are respectively convex and concave toward the stage, the axial thickness T of the respective lenses and the axial thickness S of the air space between said lenses being given in the fifth column, the respective lens to which the T value applies being identified by corresponding numerical subscripts, the values of R, T and S all being expressed in millimeters.

9. An overhead projector as defined in claim 1 wherein said projection stage is approximately 10 by 10 inches in size and said light source is fixedly mounted to position the image of the light source approximately 17 inches above the projection stage.

(References on following page)

References Cited in the file of this patent

UNITED STATES PATENTS

| | | |
|---|---|---|
| 937,266 | Robertson | Oct. 19, 1909 |
| 1,136,761 | Becker | Apr. 20, 1915 |
| 1,539,579 | Kucharski | May 26, 1925 |
| 1,738,942 | Brenkert et al. | Dec. 10, 1929 |
| 2,153,902 | Tondreau | Apr. 11, 1939 |
| 2,186,619 | Sauer | Jan. 9, 1940 |
| 2,310,273 | Bancroft | Feb. 9, 1943 |
| 2,351,618 | Katz | June 20, 1944 |
| 2,496,647 | Woodbury | Feb. 7, 1950 |
| 2,529,664 | Roysher | Nov. 14, 1950 |
| 2,564,057 | FitzGerald | Aug. 14, 1951 |
| 2,596,393 | FitzGerald | May 13, 1952 |
| 2,596,394 | FitzGerald | May 13, 1952 |
| 2,669,156 | FitzGerald | Feb. 16, 1954 |
| 2,669,704 | FitzGerald | Jan. 18, 1955 |
| 2,717,529 | Alexander | Sept. 13, 1955 |
| 2,718,171 | FitzGerald | Sept. 20, 1955 |
| 2,767,611 | FitzGerald | Oct. 23, 1956 |
| 2,811,892 | Holloway | Nov. 5, 1957 |
| 2,813,455 | FitzGerald | Nov. 19, 1957 |
| 2,824,490 | FitzGerald | Feb. 25, 1958 |
| 2,828,666 | FitzGerald | Apr. 1, 1958 |
| 2,859,660 | Lucas | Nov. 11, 1958 |
| 2,863,356 | Goldberg | Dec. 9, 1958 |
| 2,944,461 | Howell et al. | July 12, 1960 |
| 2,944,783 | Macleish et al. | July 12, 1960 |
| 2,979,986 | Miller | Apr. 18, 1961 |
| 3,003,394 | Figaretti | Oct. 10, 1961 |
| 3,081,670 | Weisglass | Mar. 19, 1963 |

UNITED STATES PATENT OFFICE
CERTIFICATE OF CORRECTION

Patent No. 3,126,786

March 31, 1964

Roger H. Appeldorn

It is hereby certified that error appears in the above numbered patent requiring correction and that the said Letters Patent should read as corrected below.

Column 9, line 39, for "main" read -- mean --; line 51, for "over head" read -- overhead --.

Signed and sealed this 28th day of September 1965.

(SEAL)
Attest:

ERNEST W. SWIDER
Attesting Officer

EDWARD J. BRENNER
Commissioner of Patents

UNITED STATES PATENT OFFICE
Certificate

Patent No. 3,126,786                      Patented March 31, 1964

Roger H. Appeldorn

Application having been made by Roger H. Appeldorn, the inventor named in the patent above identified, and Minnesota Mining and Manufacturing Company, St. Paul, Minn., a corporation of Delaware, the assignee, for the issuance of a certificate under the provisions of Title 35, Section 256, of the United States Code, adding the name of David C. Gilkeson as a joint inventor, and a showing and proof of facts satisfying the requirements of the said section having been submitted, it is this 22nd day of October 1974, certified that the name of the said David C. Gilkeson is hereby added to the said patent as a joint inventor with the said Roger H. Appeldorn.

FRED W. SHERLING,
*Associate Solicitor.*